US006812625B2

United States Patent
Kubon et al.

(10) Patent No.: US 6,812,625 B2
(45) Date of Patent: Nov. 2, 2004

(54) DISCHARGE LAMP AND OUTER BULB THEREFOR

(75) Inventors: Marcus Kubon, Aachen (DE); Juergen Schoeneich, Stolberg (DE); Paul Hellwig, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 18 days.

(21) Appl. No.: 10/227,221

(22) Filed: Aug. 23, 2002

(65) Prior Publication Data

US 2003/0048052 A1 Mar. 13, 2003

(30) Foreign Application Priority Data

Aug. 28, 2001 (DE) .......................... 101 41 961

(51) Int. Cl.[7] .............................. H01J 61/52; H01J 1/02
(52) U.S. Cl. .......................... 313/17; 313/25; 313/636; 313/493; 362/310
(58) Field of Search .......................... 313/17, 25, 636, 313/493, 110, 112; 362/310

(56) References Cited

U.S. PATENT DOCUMENTS 4,091,951 A * 5/1978 Zijlstra et al. ............ 220/2.1 R
5,451,553 A * 9/1995 Scott et al. .................... 501/86
5,541,471 A * 7/1996 Terheijden et al. ......... 313/112
5,631,522 A * 5/1997 Scott et al. ................. 313/636
5,683,949 A * 11/1997 Scott et al. .................... 501/86
6,323,585 B1 * 11/2001 Crane et al. ................ 313/112
6,429,577 B1 * 8/2002 Kiryu et al. .................. 313/25

FOREIGN PATENT DOCUMENTS

EP 0558270 A1 * 9/1993 ............ H01J/61/30
EP 0583122 A1 * 2/1994 ............ H01J/61/35
EP 0601391 A1 * 6/1994 ............ C03C/3/06

* cited by examiner

*Primary Examiner*—Vip Patel
*Assistant Examiner*—Anthony Perry

(57) ABSTRACT

A discharge lamp is disclosed comprising an enclosed discharge vessel for the generation of an electrical discharge and a casing made of glass which surrounds the discharge vessel. In order to achieve as constant properties as possible over the service life of the lamp, it is proposed that the glass material of the casing be doped with sodium in a concentration of at least 10 ppm, and preferably at least 30 ppm. According to a further embodiment, it is proposed that other alkali metals (except for sodium) be contained in a maximum concentration of 25 ppm. Surprisingly, by the appropriate choice of the outer bulb, not in direct contact with the actual discharge, the diffusion of sodium from the discharge vessel is reduced. In addition to this, the material of the outer bulb has a reduced inclination to crystallization.

2 Claims, 1 Drawing Sheet

DISCHARGE LAMP AND OUTER BULB THEREFOR

Figure 1:
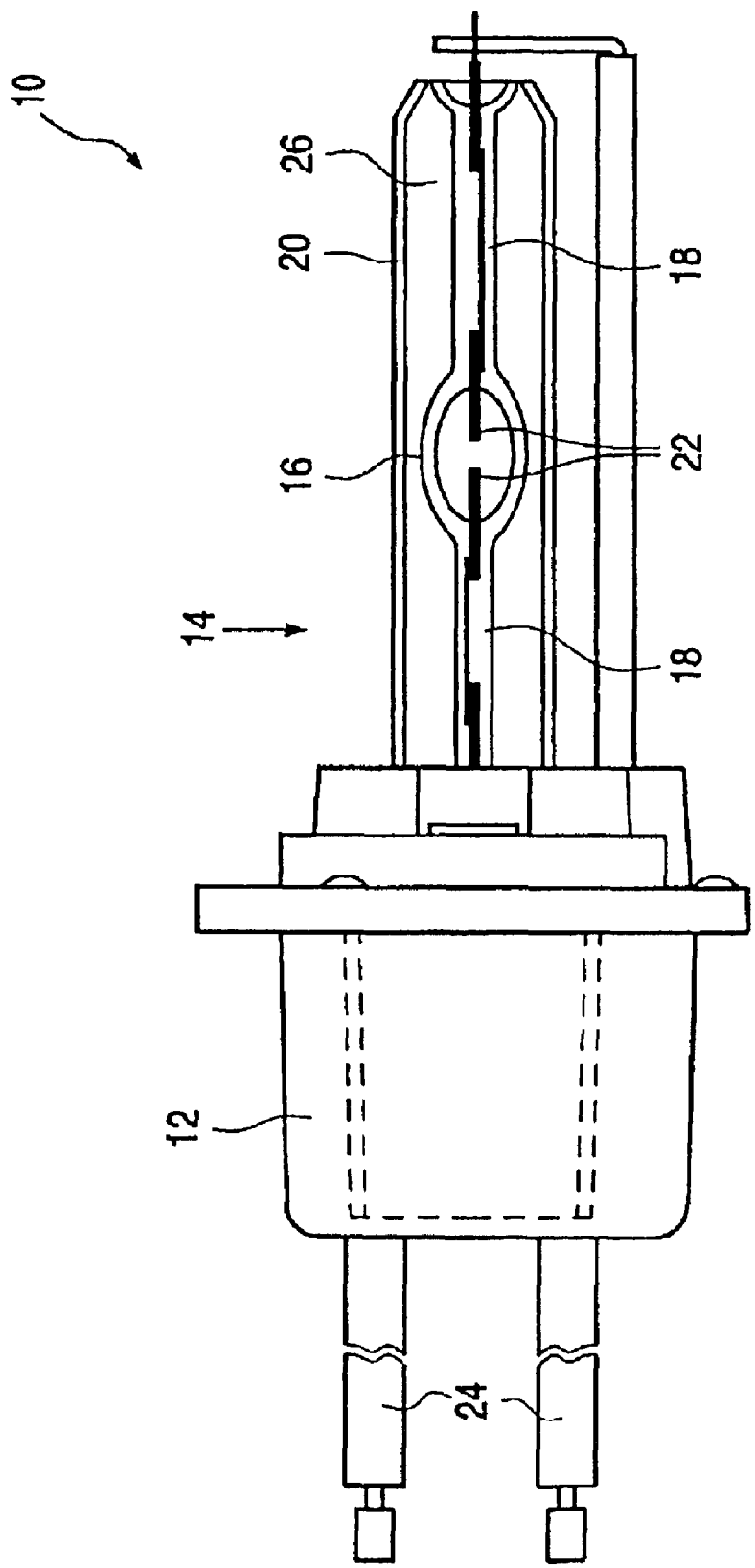

The invention relates to a discharge lamp and an outer bulb for a discharge lamp.

Discharge lamps generate light in that an electrical discharge is induced in a closed discharge vessel, usually of small volume surrounded by a glass mantle. To this end the discharge vessel is filled with a gas which contains the light-emitting metal, sodium in particular. By the imposition of an electrical voltage, usually at two electrodes, a discharge is excited which emits a strong light.

The principle is known of surrounding the discharge vessels of such discharge lamps with a further casing of glass. For example, in the case of discharge lamps for automobile headlights the actual discharge vessel, often oval in shape, is frequently surrounded by an outer bulb, such as a cylindrical glass tube. The inner walls of the glass tube are frequently very narrow, with the result that the distance from the discharge vessel is in part very small (0.2 to 1 mm, for example). In part, it may even occur that the discharge vessel and the outer bulb come into contact with one another. The outer bulb is frequently permanently connected to retaining elements of the discharge vessel. Inside the outer bulb is a gas volume, which is usually filled with air.

The function of the casing (outer bulb) around the discharge vessel consists on the one hand of easing the thermal load on the discharge vessel. The discharge vessel reaches high temperatures during operation. Due to the formation of a zone of high temperature in the interior of the outer bulb, the temperature differentials in the area of the discharge vessel are not so great as would arise without the casing. Another function of the outer bulb is frequently the filtering out of UV radiation from the light of the discharge lamp. To this end, the principle is known of doping the glass material of the casing with various different materials in order to improve the UV absorption.

In U.S. Pat. No. 5,541,471 a discharge lamp is described which is suitable as lighting for an automobile, in which a casing surrounding the discharge vessel consists of a quartz glass which is doped with the elements cerium, titanium, europium, and aluminum, so that good permeability is provided for light from the visible spectrum, but ultraviolet light is absorbed. The casing in the form of a glass bulb in this case surrounds the discharge vessel.

EP-A-558270 likewise describes lamps with a casing of quartz glass. High-purity quartz sand is doped with $TiO_2$ and $CeO_2$ in order to achieve better absorption of UV light. The quartz sand used contains a number of different elements as impurities, among them the alkaline metals K and Li at 0.5 ppm and Na at 0.6 ppm.

The principle is also known of doping the glass of the casing in order to influence the processing properties. In EP-A-0601391 a doped quartz glass is described, and its use as a casing body for lamps. In addition to high-purity $SiO_2$, the quartz glass contains in particular earth alkali oxides and boron oxide, in order to reduce the viscosity of the glass. Because of the tendency of alkali oxides to evaporate at high temperature, it is proposed that these be added only in small quantities, and preferably to do without them altogether.

During the operation of discharge lamps the problem has arisen that the properties of the lamp are not constant over its service life. As the duration of operation increases, so the amount of light discharged by the lamp diminishes. Color shifts are also to be observed.

EP-A-0583122 discloses a gas discharge lamp with an outer glass bulb and a discharge vessel. As a cause for the change of the properties of the lamp during its service life, in particular the shift in color, the diffusion of sodium from the atmosphere of the discharge vessel is cited. In order to counter this problem of the diffusion of ions, a coating of metal silicate is applied to the inner side of the glass discharge vessel.

U.S. Pat. No. 5,631,522 describes a gas discharge lamp with a discharge vessel. In order to avoid the diffusion of sodium from the discharge vessel, a special composition is proposed for the glass of the discharge vessel, namely high-purity quartz glass or synthetic silicon oxide doped with 20 to 1000 ppm yttrium or caesium in each case, preferably in combination with aluminum oxide. It is indicated that the presence of alkali metals in the glass of the discharge vessel favours the diffusion.

It is an object of the invention to describe a discharge lamp and an outside bulb for a discharge lamp, whereby the lamp can be manufactured easily and economically and will maintain the most stable characteristics possible during its service life.

The object is achieved by a discharge lamp as claimed in claim 1 and an outer bulb for a discharge lamp as claimed in claim 5. Dependent claims relate to advantageous embodiments of the invention.

Surprisingly, it has transpired that the change of the properties over a long period of operation, such as two thousand hours burning, can be decisively influenced by the suitable selection of the material of the casing surrounding the discharge vessel. This is particularly surprising because this casing, also referred to hereinafter as the outer bulb, does not have any direct contact with the actual discharge. It is therefore an advantage of the invention that no elaborate treatment is required at the actual discharge vessel, such as the application of blocking layers. The discharge vessel can be optimised in accordance with the usual requirements, without separate consideration needing to be given to the problem of the diffusion of Na ions. For preference, the casing is arranged at a distance from the discharge vessel, while a space remains between the discharge vessel and the casing. This space can be enclosed, and is filled preferably with air.

According to the invention, the glass material of the casing is doped with a small quantity of sodium. It is assumed that during operation the following reaction will take place: like the actual discharge vessel, and especially if the outer bulb is in close proximity, the casing will become very hot. The temperature in this case may rise to more than 650° C. In this situation a diffusion of the Na takes place from the material of the casing, with the result that this is located in the space between the discharge vessel and the casing. This concentration counteracts the diffusion of sodium ions from the discharge vessel.

According to the invention, sodium should be present in a concentration of at least 10 ppm, by relation to the weight, in the glass material of the casing. An upper limit for the Na content is determined by the properties required for the glass, in particular its workability and temperature stability. For lamps in which the outer bulb heats up to more than 650° C. (because of the high temperature of the discharge vessel and the small interval gap), an Na content of less than 2000 to 3000 ppm is preferred. A concentration of at least 30 ppm is particularly preferred.

According to a further embodiment of the invention, provision is made for the material of the casing to contain further alkali metals (except for sodium) but only in very small concentrations. The total of the alkali metals (except for Na) should be a maximum of 25 ppm, and preferably even less than 15 ppm. In particular, the concentration of potassium should be a maximum of 10 ppm, but for preference even less than 6 ppm.

The background to this is the role which the alkali metals, and potassium in particular, is presumed to play in the diffusion of the Na ions from the discharge vessel. These alkali metals may likewise evaporate at the high temperature of the casing during operation, and may be replaced by Na atoms on the surface of the inner bulb. The diffusion of Na ions is accordingly favoured.

An embodiment of the invention is described hereinafter in detail, on the basis of a drawing. The drawing shows in:

FIG. 1 A side view of an embodiment of a discharge lamp according to the invention.

FIG. 1 shows a side view of a discharge lamp 10. The discharge lamp 10 comprises a socket 12 and a burner 14. The burner 14 comprises a discharge vessel 16, lead wires 18, and an outer bulb 20.

The discharge vessel 16 and the lead wires 18 are formed as a single-piece glass body. Electrical conductors are in the lead wires 18, which are connected to electrodes 22 in the interior space of the discharge vessel 16. By the imposition of a voltage at the connections 24, which are connected to the electrodes 22, a gas discharge can be induced in the interior of the discharge vessel 16.

Arranged around the discharge vessel 16 is the outer bulb 20, as an enclosed glass casing. At both ends (in FIG. 1 only the front end of the outer bulb 20 is visible) the outer bulb 20, consisting of glass material, is rolled onto the lead wires 18 in the soft state, with the result that an enclosed space 26 is formed between the outer bulb 20 and the discharge vessel 16. This space is filled with air.

The discharge lamp 10 from FIG. 1 is about 8 cm long. The length of the burner is about 5 cm. The oval discharge vessel 16 has a maximum diameter of about 6 mm. The internal diameter of the outer bulb 20 is approx. 7 mm, with the result that the discharge vessel 16 does not come in contact with the outer bulb 20, but is only mechanically secured to it by means of the lead wires 18.

Inside the discharge vessel is a special gas filling, which contains luminescent substances (salts) such as alkali halogenides (NaJ, NaBr). The composition of the filling determines both the light yield and the coloring of the discharge.

In operation, the lamp 10 produces a bright light as a result of a gas discharge between the electrodes 22. In this situation, a high operating temperature is incurred. In particular, the glass material of the discharge vessel 16 heats up to more than 1000° C. The outer bulb 20 also heats up to more than 650° C.

The structure of the lamp described is easy to understand. Apart from the type presented, there are a large number of other designs of discharge lamps known to the person skilled in the art. The special feature of the lamp represented lies in the material of the casing surrounding the discharge vessel 16, which is represented here as the outer bulb 20.

The outer bulb 20 is manufactured from a special glass material. This is quartz glass with specific additives.

To this end, experiments have been conducted in which the properties of lamps with outer bulbs made of different glass materials have been compared over the service life of the lamps. The change of color and the amount of light were compared, with otherwise constant conditions, after 15 hours and 2,000 hours burning time respectively.

The results are summarized in the following table:

| Element content (ppm) | Material A | Material B |
|---|---|---|
| K | 2500 | 5 |
| Li | <1.5 | <1.5 |
| Total alkali without Na | 2500 | 7 |
| Na | <1.5 | 65 |
| Lamp stability 15 hrs–2000 hrs: | | |
| Chromaticity coordinates (Δx/Δy)*1000 | −32/−24 | −11/−17 |
| Quantity of light (at 15 hrs) | 66% | 77% |

It becomes clear that with material B, a quartz glass of high-purity $SiO_2$ doped with the alkali metals listed, a perceptibly smaller change of the lamp properties is observed over the service life. Both the loss of light quantity and the color shift with material B are substantially less than with material A. This is attributable to the low content of alkali metals (except for Na), and of potassium in particular, as well as to the doping of the material of the outer bulb 20 with a small quantity (in this case 65 ppm) of sodium, which counteracts the diffusion of NA ions from the interior of the discharge vessel.

Because of the increased light quantity stability and the color change emitted, the replacement capacity of the lamps between one another (e.g. with the replacement in part of a lamp after an accident) can be substantially better guaranteed than with conventional lamps (material A).

Methods for the manufacture of glass materials with the corresponding concentrations of doping materials have long been known to the person skilled in the art. Appropriately doped glass materials (e.g. Corning Vycor) are also commercially available.

Because of the lower doping with potassium with material B in comparison with material A, the advantage is also derived that the material of the outer bulb is harder. As a result of this, in the event of the deposition of impurities on the outer bulb, or in the event of the outer bulb 20 coming in contact with the discharge vessel 16, undesirable crystallization does not so readily occur.

The invention can be summarized in that a discharge lamp is disclosed with an enclosed discharge vessel for the production of an electrical discharge, and a casing made of glass which surrounds the discharge vessel. In order to achieve as constant properties as possible over the service life of the lamp, it is proposed that the glass material of the casing be doped with sodium in a concentration of at least 10 ppm, and preferably of at least 30 ppm. According to a further embodiment, it is proposed that further alkali metals (with the exception of sodium) are contained in a concentration of a maximum 25 ppm. Surprisingly, by the appropriate choice of the outer bulb which is not directly in contact with the actual discharge, the diffusion of sodium from the discharge vessel is reduced. In addition to this, the material of the outer bulb has a reduced inclination to crystallization.

What is claimed is:

1. A discharge lamp comprising
   an enclosed discharge vessel which contains a sodium containing fill for the generation of an electric discharge,
   and a casing made of glass, which surrounds the discharge vessel, wherein
   the glass material of the casing is doped with sodium in a concentration of at least 10 ppm and less than 3000 ppm by relation to the weight; and
   the glass material of the casing contains, in addition to sodium, other alkali metals in a maximum concentration totaling 25 ppm by relation to the weight.

2. A discharge lamp comprising
   an enclosed discharge vessel which contains a sodium containing fill for the generation of an electric discharge,
   and a casing made of glass, which surrounds the discharge vessel, wherein
   the glass material of the casing is doped with sodium in a concentration of at least 10 ppm and less than 3000 ppm by relation to the weight; and
   the glass material of the casing contains potassium in a maximum concentration of 10 ppm by relation to the weight.

* * * * *